Oct. 25, 1949.　　　　M. C. KAZEN　　　　2,485,740
SPARE TIRE AND WHEEL CARRIER
Filed Jan. 17, 1947　　　　　　　　　　　　2 Sheets-Sheet 1
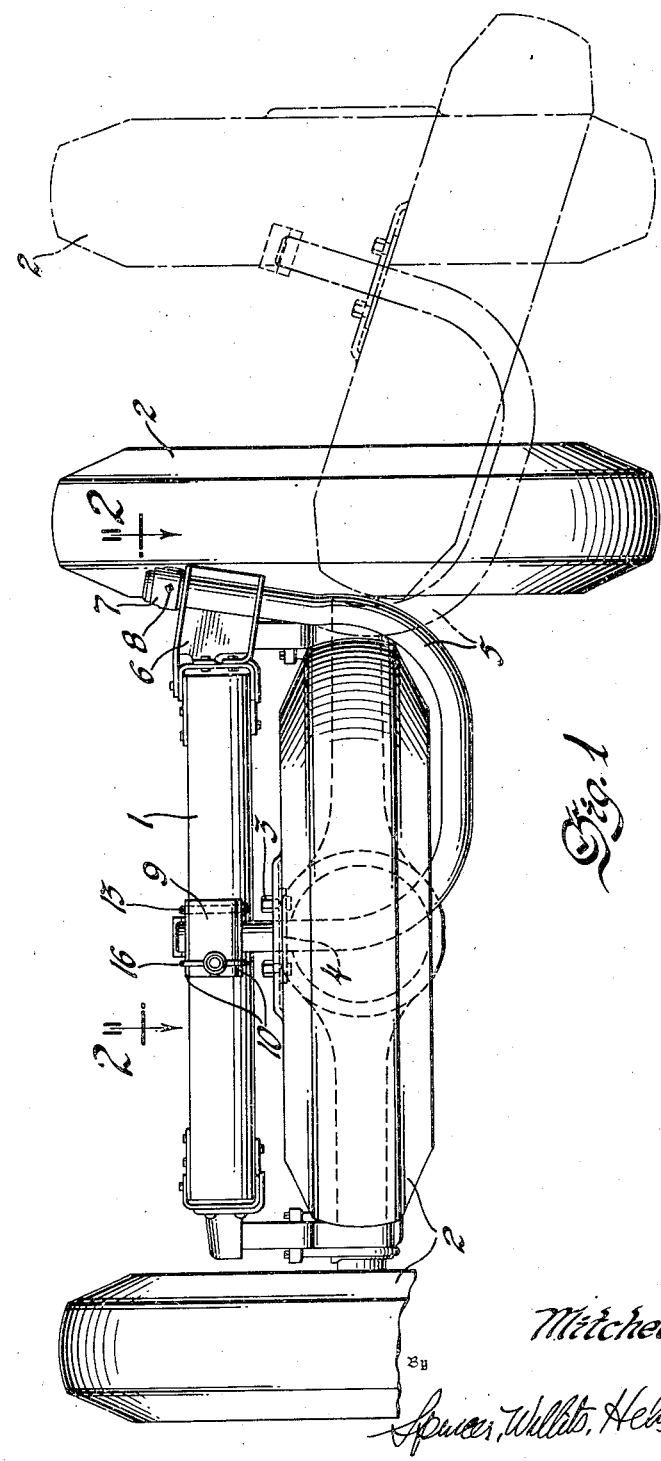
Inventor
Mitchell C. Kazen
By
Spencer, Willets, Helwig & Baillio
Attorneys

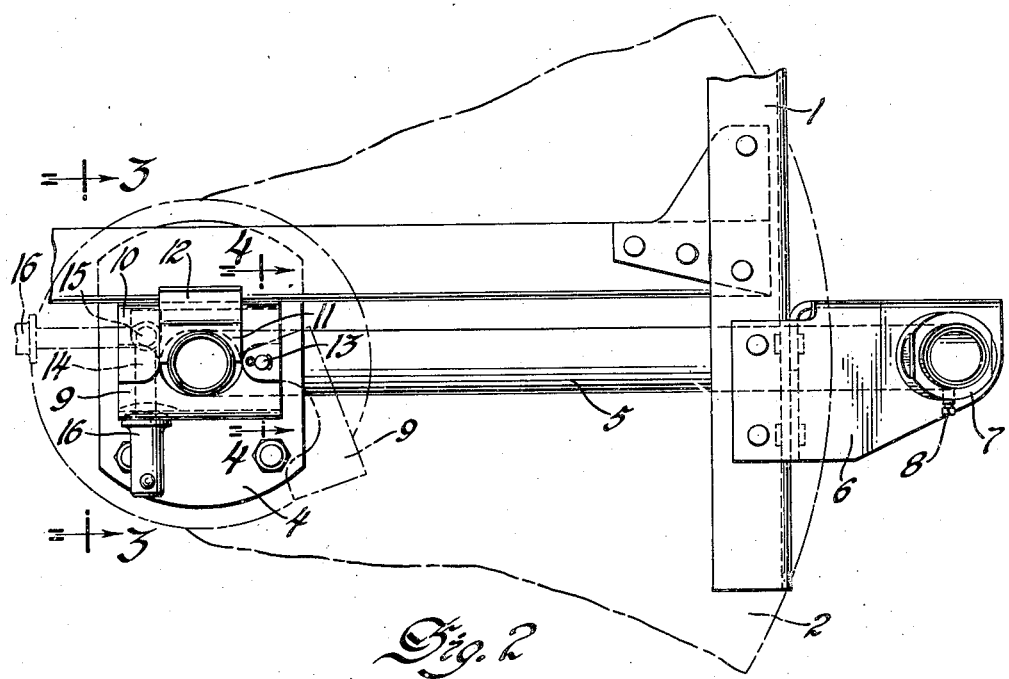

Patented Oct. 25, 1949

2,485,740

UNITED STATES PATENT OFFICE 2,485,740

SPARE TIRE AND WHEEL CARRIER

Mitchell C. Kazen, Detroit, Mich., assignor to General Motors Corporation, Detroit, Mich., a corporation of Delaware Application January 17, 1947, Serial No. 722,721

5 Claims. (Cl. 224—42.22)

This invention relates to an improved underslung tire carrier especially adapted for use on heavy duty trucks, whose detachable wheel and tire assemblies often weigh more than one man can conveniently handle when tire changes are necessary. More particularly the structure is intended to facilitate manipulation of the spare assembly to and from stowage position under the chassis and which storage space often is somewhat inaccessible for working a bulky and heavy tire on the conventional underslung mounting.

In designing an easier to use mounting the aim has also been toward simplicity and low cost as well as sturdiness and long life. Most of the parts can be readily formed from standard shaped stock and are joined and interfitted for mutual cooperation in a manner to afford a maximum of strength with small weight and size.

In the main the carrier consists of a relatively short length of ordinary tubing bent to U-shape to straddle only one half of the tire diameter with its two legs extending upwardly one outside of the horizontally disposed tire for pivotal suspension on the vehicle frame and the other through the center of the tire where it carries a wheel hub mounting plate and is detachably hung from the frame near the vehicle center line. Frame brackets from which the carrier tube is slung have received particular attention with respect to simplicity and inherent strength. Thus the bracket for the outer leg is a husky channel section providing widely spaced flanges pierced to receive and locate the upper end of the tube whose weight is transmitted through a bearing collar into the upper flange and both the flanges and web of the bracket have integral attachment formations for secure frame fastening. Channel section pieces also form the detachable mounting for the free swinging end of the tube and are in the nature of a pair of internested parts affording a box section and embracing the tube between their flanges with one of the channels being fastened to the chassis and constituting a bearing for a skid plate fixed on the tube and the other channel having a detachable relation with the fixed channel for removably holding the carrier tube in the normal load sustaining position.

By diverging outwardly the upper end of the pivoted carrier leg a vertically inclined hinged axis is provided for the swinging carrier whose travel through an arc of 180° is a path inclined to the ground between the horizontal plane of the tire in an out of the way elevated storage position to a tilted close to the ground position beyond the margin of the chassis where removal and replacement of the spare tire can be conveniently accomplished without awkwardness and manual strain.

For a more complete explanation of the invention reference will be made to the accompanying drawing wherein Figure 1 is a rear elevation of a motor vehicle chassis having the improved tire carrier; Figure 2 is a plan view as on line 2—2 of Figure 1 and Figures 3 and 4 are detail longitudinal sectional views in larger scale on lines 3—3 and 4—4 of Figure 2.

In the drawing the chassis frame indicated at 1 is spring suspended on the usual drive axle for the road wheels 2—2. A spare road wheel including a wheel and tire assembly is shown in full lines in Figure 1 mounted in a horizontal plane behind the rear axle and under and closely adjacent the chassis 1. Its wheel hub is detachably secured by bolts and nuts 3 to a flat mounting plate 4 mounted near the upper end of one vertical leg of a U-shaped swinging carrier bar 5 which extends radially under a portion of the tire resting on the mounting plate 4 and has its opposite upstanding leg pivotally mounted at the side of the chassis frame.

The upper end of the hingedly mounted leg diverges outwardly or is vertically inclined and extends through vertically offset apertures in the widely spaced flanges of a channel section bracket 6 riveted to the side of the chassis 1. For fastening purposes attachment ears are constituted by extensions on both the web and each of the flanges of the channel bracket and these extensions are properly bent so as to dispose the bracket 6 in a downwardly and outwardly inclined direction to fit the vertical inclination of the cooperating leg of the U-shaped carrier 5. A bearing collar 7 threaded on the leg and secured by a set screw 8 is rotatably supported by the upper flange of the bracket 6 to accommodate the rotation of the tube in the apertured locating flanges of the bracket.

By reason of the tilted carrier axis the carrier may be projected to the side of the vehicle and close to the ground, as illustrated by the broken lines in Figure 1. The two dotted line positions in which the spare tire is shown indicate that the manual lifting of the tire is reduced to a minimum and that the tire at all times rests either directly on the ground or on the carrier structure and that it can be easily swung between the two dotted line positions. The fastening bolts can be conveniently manipulated in the outermost position of the assembly and the mounted tire can be easily swung from one position to the other.

In the full line normal load carrying position the weight is transmitted largely through the center frame bracket which consists principally of a pair of nested and oppositely disposed channels 9 and 10, the latter of which is riveted securely to the chassis 4 and its uppermost flange provides a bearing surface for a skid plate 11 welded to the upper terminal of the upstanding leg at the free end of the carrier 5. The skid plate at its nose 12 is turned upwardly to afford a camming action when the skid plate is moved home. Both of the flanges of the two channels 9 and 10 are of forked formation or are provided with U-shaped slots to receive and locate the tubular leg of the carrier 5 and the channel 9 provides a retainer jaw which can be swung out of the way of the U-shaped carrier 5. For the pivotal interconnection a hinge pin 13 extends through the flanges at one side. To the other side the channel 9 has a laterally disposed open ended slot to receive a swinging bolt 14 pinned to a mounting clevis 15 and threadedly engaged at its free end by a hand nut 16 having a convex seating head to be engaged with and maintained within a concave retainer depression around the open ended slot in the channel 9. If desired an anti-theft locking mechanism may be provided to key the hand nut 16 against rotation relative to its supporting bolt 14.

While the foregoing description has dealt with the preferred embodiment of the invention it will be obvious that the various modifications may be made as come within the scope of the accompanying claims. Furthermore, while specific reference has been made to a motor truck it will be understood that the swinging carrier may be variously applied to other types of vehicles and that the mounting of the parts can be such that the carrier may be swung either to the right or to the left of the vehicle as well as longitudinally thereof.

I claim:

1. In a spare tire carrier swingable between an elevated stowage position horizontally under a vehicle and an accessible lowered position beyond the vehicle, a U-shaped primary carrier having its upstanding legs divergently related, an outwardly disposed fulcrum support for one of said legs providing a vertically inclined axis for the swingable carrier, means on the other leg for detachably mounting a spare tire horizontally and partly within the space between said legs and above the base of the U-shaped carrier, a skid plate on the carrier leg above said mounting means, a forked bracket engageable with the skid plate to supplement said support in bearing the weight of the carrier in stowage position and receiving the carrier leg therein to locate the same, and a pivoted latch for closing the open end of the forked bracket to retain the leg therein.

2. In an underslung tire carrier, a lever arm for detachably supporting a spare tire in horizontal position, means at one end of the arm to pivotally mount the same on a vertically inclined axis which enables the arm to be swung outwardly and downwardly, means to project upwardly from the arm and through the spare tire, a forked bracket to receive the upper end of said upwardly projecting means, a swinging latch to close the forked bracket, an adjustable retainer for the latch and a skid plate on said upper end of the upwardly projecting means to bear on said forked bracket.

3. In a vehicle underslung tire carrier, a centrally disposed supporting bracket on the vehicle, a U-shaped sling having a tire hub mounting plate on one of its upright arms with a skid plate at the upper end thereof for slidable support on said bracket and having its other upright arm terminating in a vertically inclined end portion, a frame bracket of channel section extending outwardly and downwardly and having vertically spaced flanges in planes normal to said vertically inclined arm end, said flanges having vertically offset apertures to receive and pivotally guide said arm end and a bearing collar carried by said arm end to bear on one of said flanges for suspending the arm.

4. In a motor vehicle having an underslung tire carrier, a U-shaped sling dependent from the vehicle with one arm pivotally suspended at one side, means on the other upstanding arm to detachably mount a spare tire in horizontal position, said last mentioned arm projecting upwardly through the center of the tire and carrying a skid plate, a channel shaped supporting bracket having upper and lower horizontal flanges, the upper of which provides a bearing for the skid plate, a mating channel shaped part hinged to the bracket to removably clasp the central arm thereto and arranged so that its flanges telescope within the bracket and engage the bracket flanges to assist in transmission of load from one to the other.

5. An underslung tire carrier arranged for swinging travel between a horizontal tire storage position and an accessible position inclined toward the ground, including a pair of transversely spaced suspension bars with a joining span between their lower ends to constitute a U-shaped sling, a pair of fixed suspension hangers for the upper ends of said suspension bars, one of said bars extending upwardly for encirclement by a spare tire and carrying midway of its height a tire supporting formation and terminating at its upper end in a skid plate having an inclined camming nose at the leading edge thereof, said skid plate being slidably engageable with one of the fixed hangers at storage position limit of swinging travel of the sling and the other suspension bar extending upwardly beyond the tire periphery and terminating at its upper end in a vertically inclined spindle pivotally suspended about the vertically inclined axis thereof in the other fixed hanger.

MITCHELL C. KAZEN.

REFERENCES CITED

The following references are of record in the file of this patent:

UNITED STATES PATENTS

| Number | Name | Date |
|---|---|---|
| 1,813,094 | Appel | July 7, 1931 |
| 2,354,944 | Clark | Aug. 1, 1944 |
| 2,378,911 | Clark | June 26, 1945 |
| 2,399,207 | Clark | Apr. 30, 1946 |
| 2,449,544 | Ballard | Sept. 21, 1948 |

FOREIGN PATENTS

| Number | Country | Date |
|---|---|---|
| 749,561 | France | May 8, 1933 |